(No Model.)

C. A. KLOTZ.
BLOWING ENGINE.

No. 516,442. Patented Mar. 13, 1894.

Witnesses,
J. K. Rouse
J. A. Bayless

Inventor,
Charles A. Klotz
By Dewey & Co.
Attys

THE NATIONAL LITHOGRAPHING COMPANY,
WASHINGTON, D. C.

UNITED STATES PATENT OFFICE.

CHARLES A. KLOTZ, OF VALLEJO, CALIFORNIA.

BLOWING-ENGINE.

SPECIFICATION forming part of Letters Patent No. 516,442, dated March 13, 1894.

Application filed May 22, 1893. Serial No. 475,130. (No model.)

*To all whom it may concern:*

Be it known that I, CHARLES A. KLOTZ, a citizen of the United States, residing at Vallejo, Solano county, State of California, have invented an Improvement in Blowing-Engines; and I hereby declare the following to be a full, clear, and exact description of the same.

My invention relates to improvements in blowing engines.

It consists in certain details of construction which will be more fully explained by reference to the accompanying drawings, in which—

Figure 1:
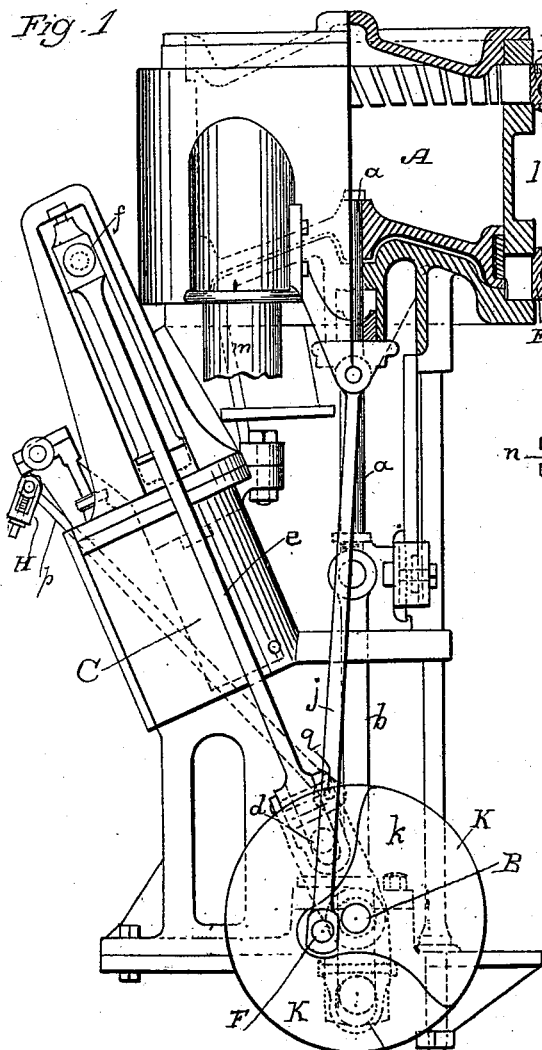
Figure 2:
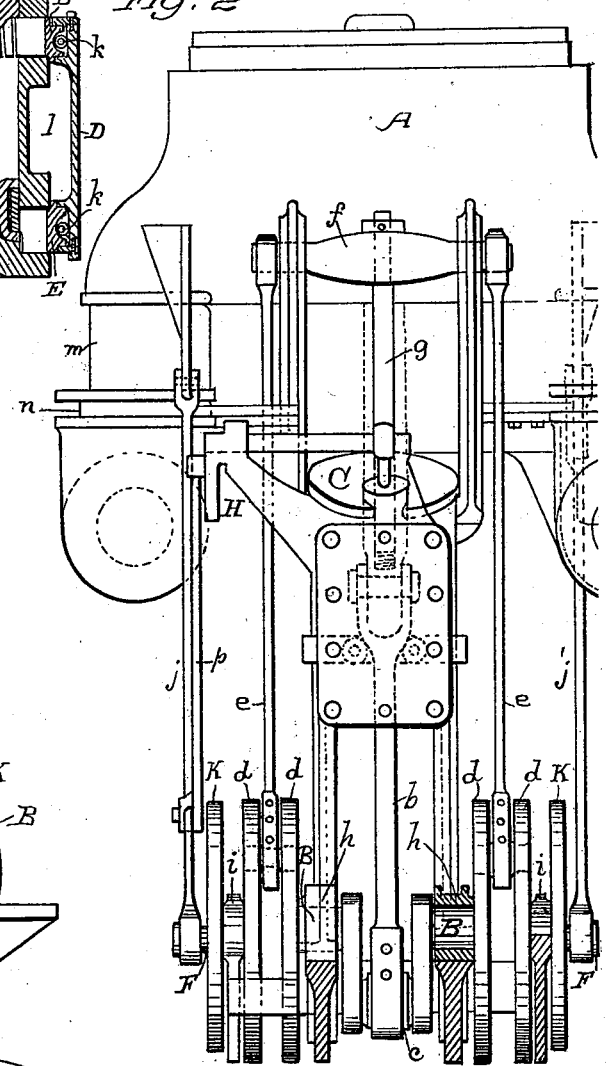
Figure 3:
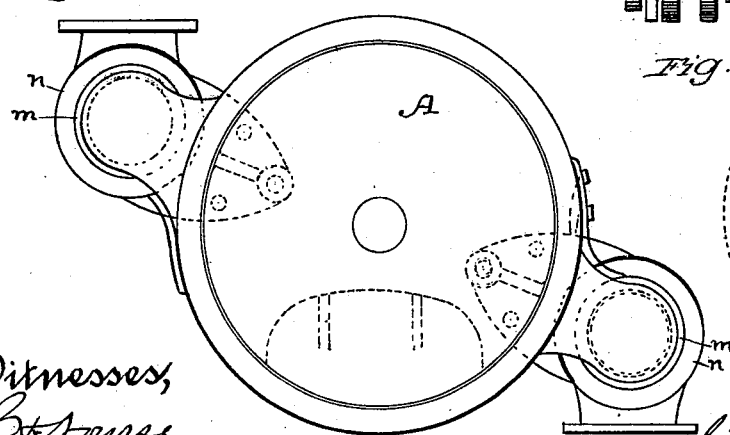
Figure 4:
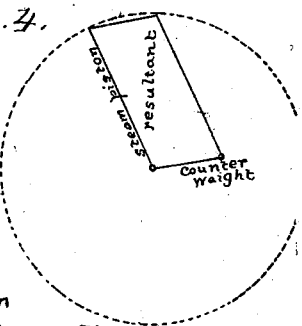

Figure 1 is a side elevation with partial section of air cylinder and valve. Fig. 2 is a front elevation. Fig. 3 is a plan view of the air cylinder and the outlet pipes. Fig. 4 is a diagrammatic view showing the resultant of the force applied.

The object of my invention is to provide a balanced, high speed, blowing or air forcing engine, and I accomplish this by inclining the steam and air cylinder with relation to each other in the same plane, and connecting them with a single crank shaft, by means of approximately oppositely placed cranks, and by the use of a relatively arranged counterweight. In the usual construction of these engines, it is extremely difficult to run them at a high speed because of the vibration caused by the lack of balance of the parts, and no arrangement of counterweights or oppositely moving mechanisms will overcome this difficulty sufficiently.

In my invention, I have so arranged the parts with relation to each other that I am enabled to almost perfectly balance the moving parts, secure a minimum of vibration with a high rate of speed and great economy of space, which is necessary when such engines are to be employed on ship-board where they are valuable for ventilation, to supply proper draft for boiler furnaces, or compressed air for siphoning water and for various other purposes.

In my invention, A is the air cylinder, which, in the present case I have shown placed in a vertical line above the crank shaft B, and C is the steam cylinder, which is placed at an inclination in the same vertical plane and just outside of the air cylinder, and with its axis converging to the same crank shaft B. The cylinder C is secured to the same frame-work with A by suitable flanges with bolts as shown. The piston of the air cylinder A has a piston rod *a*, a cross-head with which it is connected traveling in suitable guides, and a connecting rod *b* uniting with a crank *c* upon the crank shaft B, and centrally between the cranks *d* to which the steam engine connecting rods *e* unite. These connecting rods *e* take hold of the outer ends of the cross-head *f* from the center of which the piston-rod *g* of the engine extends into the steam cylinder, and connects with the piston thereof. The crank *c* of the air compressor is set nearly opposite to the cranks *d* of the steam cylinder, the difference from exact opposition being represented by the relative inclinations of the cylinder axes to each other, as shown in Fig. 1, where the air cylinder crank being in direct line with the axis of the cylinder and at the lowest point of its stroke, the cranks of the steam cylinder are also in a plane taken through the axis of the steam cylinder, and cutting the longitudinal axis of the shaft B, which thus throws the cranks *d* a little to one side of the vertical central line at the upper part of their revolution, while the crank *c* of the air engine is exactly in the central line at the lower part of its revolution.

K K are counterbalance weights fixed to the ends of the crank shaft B, and so arranged with relation to the oppositely arranged cranks as to counterbalance the small difference caused by the before described arrangement of the cranks, and also to counterbalance the air valve in its movements.

For economy of construction I have shown the central cranks of the air engine, and the inner parts of the crank *d* of the steam engine fixed to or formed with the central portions of the shaft B which turn in journal-boxes *h* between the two cranks *c* and *d*. Upon the outer parts of the shaft B which turn in journal-boxes *i*, are fixed the outer portions of the cranks *d* which may be in the form of cast iron disks having holes bored to receive the outer ends of the crank pins of the cranks *d*.

The counterbalanced weights K are fixed upon the outer ends of the shaft as shown, and have pins F fitted to them at a sufficient distance from the center to form eccentrics or cranks by which the valve gear of both the air compressor and the steam engine are actuated. The connection between the pins F and the valve D of the the air cylinder is made by eccentric rods $j$ suitably connected with opposite sides of the valve D which is made cylindrical and surrounding the air cylinder A. Within the cylindrical valve D are the packing rings E which are adjustably fitted to the valve by overlapping joints as shown.

In order to retain the packing rings in close contact with the surfaces on the cylinder over which they move, I have shown the rings channeled on the outer periphery to a sufficient depth to receive the coil springs $k$ which, lying within these channels, extend entirely around the outside of the packing rings and the cylinder, and by the constant tension of these springs, the rings are retained in close contact, the joints by which they are united with the exterior valve allowing of the necessary motion between the two to maintain the joint without disconnecting the parts. The air which is drawn into the cylinder at either end by the reciprocation of the piston and the opening of the air valve, is discharged through the same ports when the valve is shifted, so that the parts connect with a cylindrical channel $l$ surrounding the central portion of the cylinder and within the valve D. This channel connects with vertically arranged discharge pipes $m$ standing parallel with the axis of the cylinder, and these pipes being fixed to the outside of the valve casing D, will reciprocate with it. The ends of the pipes enter stuffing boxes in corresponding connecting pipes or chambers $n$ which in turn connect with the final discharge pipes or outlets. By this construction, the pipes connecting with the valve are allowed to reciprocate with it without leaking at the joint between them and the outlet pipes.

The valve gear of the steam cylinder is actuated by a connecting rod $p$ which extends from a pin $q$ on the eccentric rod $j$ by which the air valve is actuated, the motion of this eccentric rod being sufficient to actuate the steam valve rod, and through it the steam valve, which in the present case is shown as being actuated by a rock shaft and link H with the usual adjustment for cutting off steam at any desired point in the stroke.

Having thus described my invention, what I claim as new, and desire to secure by Letters Patent, is—

1. The inverted vertically acting air compression cylinder provided with admission and discharge ports, an inclined steam cylinder in the same plane, with the axis converging to the center of the common crank shaft, with which both pistons are connected by approximately oppositely fixed cranks, counterbalance weights on said crank-shaft a cylindrical valve surrounding the air cylinder, eccentric rods connecting with pins projecting from the outer faces of the counterbalance weights whereby the air valve is reciprocated and counterbalanced, and a connection between said eccentric rod and the rocker arm of the steam cylinder valve whereby the latter is actuated simultaneously and from the same eccentric, substantially as herein described.

2. The inverted vertically disposed air cylinder with steam cylinder and connections whereby its piston is reciprocated, a cylindrical inclosing valve and ports through which air is alternately admitted and discharged during the reciprocations of the valve, packing rings surrounding the cylinder connected with the valve and having channels around their outer periphery, and elastic springs surrounding the packing rings within said channels whereby the rings are held in contact with their seats by constant elastic pressure, substantially as herein described.

3. The inverted vertically disposed air cylinder with the actuating steam cylinder and connections, as shown, a cylindrical valve inclosing the cylinder, ports in the periphery of the cylinder controlled by the valve for the admission and escape of air, a central channel around the cylinder into which the air is delivered, pipes connecting with the valve, reciprocating therewith and extending outside of the cylinder parallel with its axis, receiving and delivery chambers into which said pipes enter and stuffing boxes through which they reciprocate whereby the air is delivered without leakage, substantially as herein described.

In witness whereof I have hereunto set my hand.

CHARLES A. KLOTZ.

Witnesses:
S. H. NOURSE,
J. H. BAYLESS.